United States Patent
Ishizaki et al.

[11] Patent Number: 5,877,577
[45] Date of Patent: Mar. 2, 1999

[54] ELECTRIC HYDRAULIC HYBRID MOTOR, CONTROL DEVICE AND CONTROL METHOD FOR THE SAME MOTOR

[75] Inventors: Naoki Ishizaki, Kawachi-gun; Kazuo Uehara, Tokyo; Hiromasa Yamaguchi, Oyama, all of Japan

[73] Assignee: Komatsu Ltd., Tokyo, Japan

[21] Appl. No.: 913,031

[22] PCT Filed: Mar. 5, 1996

[86] PCT No.: PCT/JP96/00525

§ 371 Date: Sep. 5, 1997

§ 102(e) Date: Sep. 5, 1997

[87] PCT Pub. No.: WO96/27938

PCT Pub. Date: Sep. 12, 1996

[30] Foreign Application Priority Data

Mar. 6, 1995 [JP] Japan .................................. 7-070387

[51] Int. Cl.[6] .............................. F04B 9/00; H02K 7/14
[52] U.S. Cl. ......................... 310/261; 417/271; 417/356
[58] Field of Search ...................... 310/261, 96; 417/269, 417/271, 355, 356; 91/499

[56] References Cited

FOREIGN PATENT DOCUMENTS

| | | |
|---|---|---|
| 49-039721 | 4/1974 | Japan . |
| 50-059696 | 5/1975 | Japan . |
| 53-037523 | 10/1978 | Japan . |

*Primary Examiner*—Steven L. Stephan
*Assistant Examiner*—Judson H. Jones
*Attorney, Agent, or Firm*—Sidley & Austin

[57] ABSTRACT

The present invention is an electric hydraulic hybrid motor, a control device, and a control method for the same motor, which is small in size and simple in construction, which can be equal horsepower controlled or torque limiter controlled when required. To this end, an electric hybrid motor includes a cylinder block (21), provided for common use by a hydraulic pump (20) and by a hydraulic motor (50) and rotated integrally with a rotor (14); a number of plungers (23), provided for the hydraulic pump (20) and rotated integrally with the rotor (14); a number of plungers (23*a*), provided for the hydraulic motor (50); a variable swash plate control device (33), for setting the discharge rate from the hydraulic pump (20); a swash plate setting device (56), for setting the discharge rate from the hydraulic motor (50); and a case (11) in which these constituent members are disposed.

21 Claims, 6 Drawing Sheets

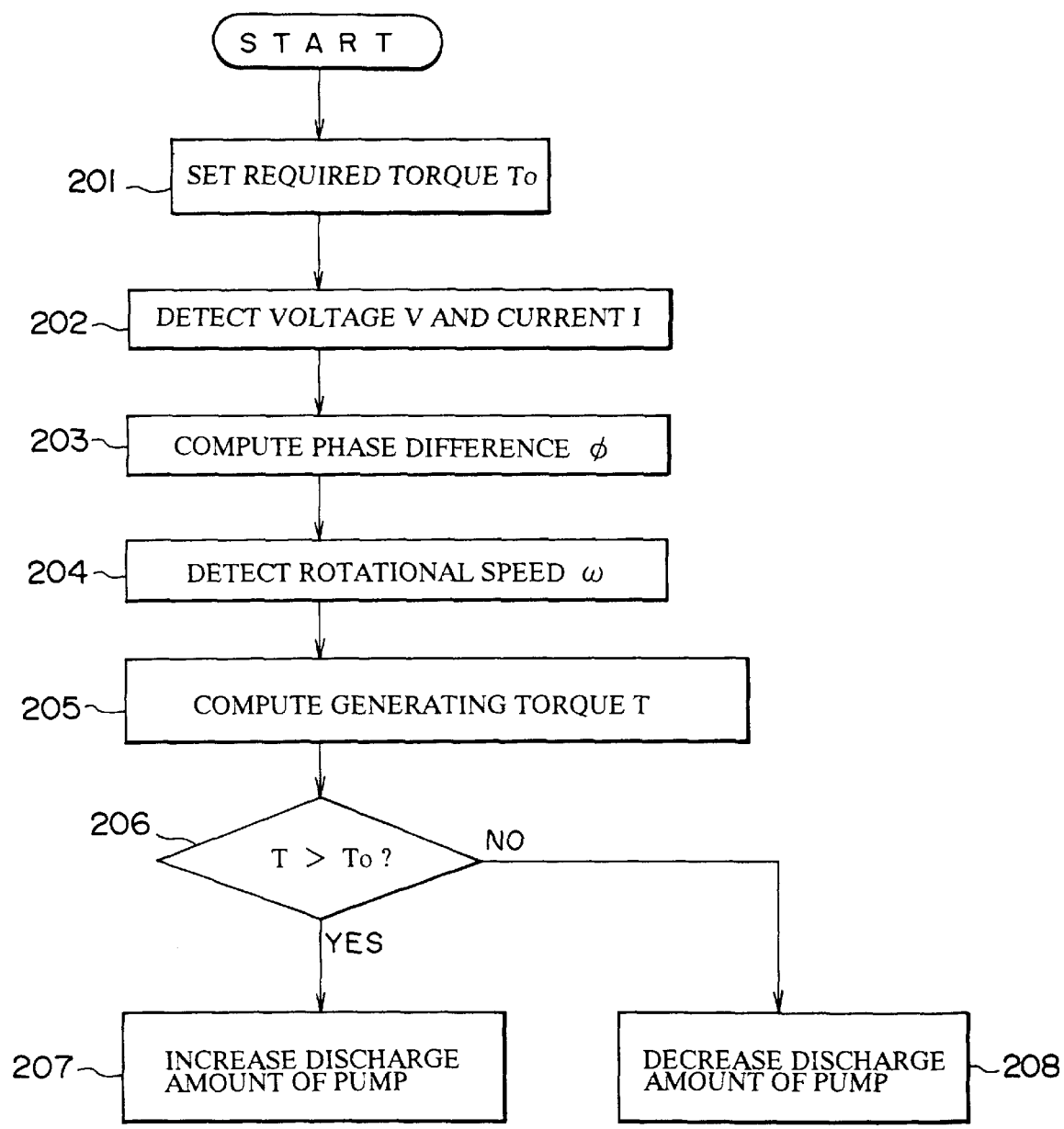

ELECTRIC HYDRAULIC HYBRID MOTOR, CONTROL DEVICE AND CONTROL METHOD FOR THE SAME MOTOR

TECHNICAL FIELD

The present invention relates to an electric hydraulic hybrid motor, a control device, and a control method for the same motor, and particularly to an electric hydraulic motor which houses a hydraulic pump, driven by an electric motor, and a hydraulic motor, which outputs torque by receiving pressurized oil from the hydraulic pump, located inwardly of the rotor of the electric motor.

BACKGROUND ART

Conventionally, it is known that a hydraulic pump, driven by an electric motor, and a hydraulic motor, outputting torque by receiving pressurized oil from the hydraulic pump, can be provided integrally with the electric motor (for example, Japanese Patent Application Publication B1 53-37523). According to the Japanese Patent Application Publication B1 53-37523, the hydraulic variable speed electric motor is provided with a rotor which is located inwardly of the stator of the electric motor, and a hollow shaft, which is located inwardly of the rotor and which has both ends supported by bearings. The hollow shaft is electrically driven, integrally with the rotor, and is used as an input shaft for the power of the hydraulic pump. A projecting shaft, which is integral with the outside case for the stator and rotor of the electric motor, is fixedly provided at the hollow shaft. The hydraulic pump is provided in the direction of the outer diameter of the projecting shaft and axially adjacent to the stator and rotor of the electric motor. The hollow shaft and the projecting shaft, provided fixedly and integrally with the hollow shaft, are supported by the bearings at three points. The hydraulic motor is provided inside the hollow shaft so as to oppose the hydraulic pump. The pressurized oil from the hydraulic pump goes from the hydraulic pump through the rotating hollow shaft and the integrated projecting shaft, to the external case of the electric motor and is further sent from the external case to the hydraulic motor.

However, in the above-described conventional hydraulic variable speed electric motor, the hydraulic pump is placed axially adjacent to the stator and the rotor of the electric motor; therefore, the length of the hydraulic variable speed electric motor is great. In addition, the pressurized oil from the hydraulic pump is sent through the rotating hollow shaft and the integrated projecting shaft and is sent from the external case to the hydraulic motor; therefore, the hydraulic variable speed electric motor similarly has a great length. Further, the hollow shaft and the integrated projecting shaft are supported by the bearings at three points, making the center shaft core difficult to access and a large clearance between the external case and the rotating integrated projecting shaft is necessary. For this reason, the leakage of the pressurized oil from the clearance is increased. The charging circuit is positioned at the outside; therefore, the space is required, and the external shape and appearance become larger. In addition, as the horsepower control or the torque control is carried out by a controlling device from another machine or device, it is necessary to provide a space for installing the controlling device other than in the machine. In addition, it is necessary to connect the electric hydraulic hybrid motor and the controlling device, and there is a disadvantage of the structure being complicated.

SUMMARY OF THE INVENTION

The present invention is made in order to eliminate the disadvantages of the above-described conventional art, and its object is to provide an electric hydraulic hybrid motor, a control device, and a control method for the same motor, which is designed to be small in size by housing a hydraulic pump and a hydraulic motor in the stator of the electric motor and which has excellent performance and controllability.

The electric hydraulic hybrid motor relating to the present invention is an electric hydraulic hybrid motor provided with a hydraulic pump and a hydraulic motor to the interior of a rotor of an electric motor, and is characterized by including:

a cylinder block, which is provided for common use by the hydraulic pump and by the hydraulic motor and which rotates integrally with the rotor;

a number of plungers which are provided at the hydraulic pump, and which rotate integrally with the rotor;

a number of plungers which are provided at the hydraulic motor;

a variable swash plate control device for setting the discharge rate from the hydraulic pump;

a swash plate setting device for setting the discharge rate of the hydraulic motor; and a case, in which the cylinder block, the plungers for the hydraulic pump, the plungers for the hydraulic motor, the variable swash plate control device, and the swash plate setting device are positioned.

It is desirable that the above-described case have a cooling device attached. In addition, a charging hydraulic circuit can be provided in a shaft extending through the cylinder block.

The first aspect of the control device of the electric hydraulic hybrid motor relating to the present invention is characterized by including the structure of the electric hydraulic hybrid motor relating to the above-described invention, and by further including:

an electric power consumption setting device, for setting a set electric power consumption for the electric motor;

a voltage detecting device, for detecting a voltage to the stator of the electric motor;

an electric current detecting device, for detecting an electric current to the stator; and a controller, which computes the actual electric power consumption of the electric motor based on the detected voltage and the detected electric current, which compares the set electric power consumption and the computed electric power consumption, and which outputs a signal to control the discharge rate from the hydraulic pump in a manner corresponding with the result of the comparison.

The second aspect of the control device of the electric hydraulic hybrid motor relating to the present invention is characterized by including the structure of the electric hydraulic hybrid motor relating to the above-described invention, and by further including:

an output torque setting device, for setting a set output torque for the hydraulic motor;

a rotational speed detecting device, for detecting the rotational speed of the hydraulic motor;

a voltage detecting device, for detecting the voltage to a stator of the electric motor;

an electric current detecting device, for detecting the electric current to the stator; and a controller, which computes the actual output torque of the hydraulic motor based on the detected rotational speed, the detected voltage, and the detected electric current, which compares the set output torque and the computed output torque, and which outputs to the variable swash plate controlling device a signal to control the discharge rate from the hydraulic pump in a manner corresponding with the result of the comparison.

The first aspect of the invention of the control method of the electric hydraulic hybrid motor relating to the present invention is a control method for an electric hydraulic hybrid motor including an electric motor, and a hydraulic pump and a hydraulic motor which are provided to the interior of a rotor of the electric motor, and is characterized by including the steps of:

setting a set electric power consumption for the electric motor, which drives the hydraulic pump;

computing the actual electric power consumption of the electric motor, which drives the hydraulic pump, while supplying variable discharge rates to the hydraulic motor; and decreasing the discharge rate from the hydraulic pump when the computed electric power consumption is greater than the set electric power consumption.

The second aspect of the invention of the control method of the electric hydraulic hybrid motor relating to the present invention is characterized by including the steps of:

setting a set output torque for the hydraulic motor;

computing the actual output torque which the hydraulic motor outputs based on the electric current and the voltage to the electric motor driving the hydraulic pump, and based on the rotational speed of the hydraulic motor; and when the computed output torque is greater than the set output torque, increasing the discharge rate from the hydraulic pump.

According to the structure of the above-described invention, the rotor of the electric motor is rotationally driven by passing electric current through the coil of the stator, and the cylinder block and the pump plungers are integrally rotated with the rotor. As a result of the rotation, the plungers for the hydraulic pump stroke the cylinder block by the variable swash plate control device, and pressurized oil is discharged. The pressurized oil is sent through the cylinder block to the plungers of the hydraulic motor, and the plungers of the hydraulic motor stroke the cylinder block. By the stroke of the plungers of the hydraulic motor, the swash plate setting device of the hydraulic motor is pressed, and the output shaft, which is integral with the swash plate setting device, is rotated, with torque being outputted.

Heat generated by the electric motor, the hydraulic pump, and the hydraulic pump is absorbed in the lubricating oil inside the case, and the lubricating oil is sent to the cooling device, attached to the case, to be cooled. The cooled lubricating oil is returned to the inside of the case to cool and lubricate the hydraulic pump, the bearings of the hydraulic pump, the stator, and so on. At this time, it is preferable to detect and control the temperature of the lubricating oil so that the temperature becomes a specified temperature. The pressurized oil, leaking from the hydraulic pump and the hydraulic motor, is replenished from the charging hydraulic circuit (for example, the hydraulic circuit provided with check-valves) provided in the shaft within the cylinder block.

In addition, equal horsepower control is enabled by measuring the power consumption of the electric motor and by controlling the measured value to be a set value. Equal torque, or torque limiter control is enabled by measuring the rotational speed of the hydraulic motor, and by controlling the discharge rate from the hydraulic pump.

BRIEF DESCRIPTION OF THE DRAWINGS

FIG. 9 is a flow chart of the equal torque control relating to the embodiment.

BEST MODE FOR CARRYING OUT THE INVENTION

A preferred embodiment relating to the present invention will be particularly described below with reference to the attached drawings.

Figure 1:
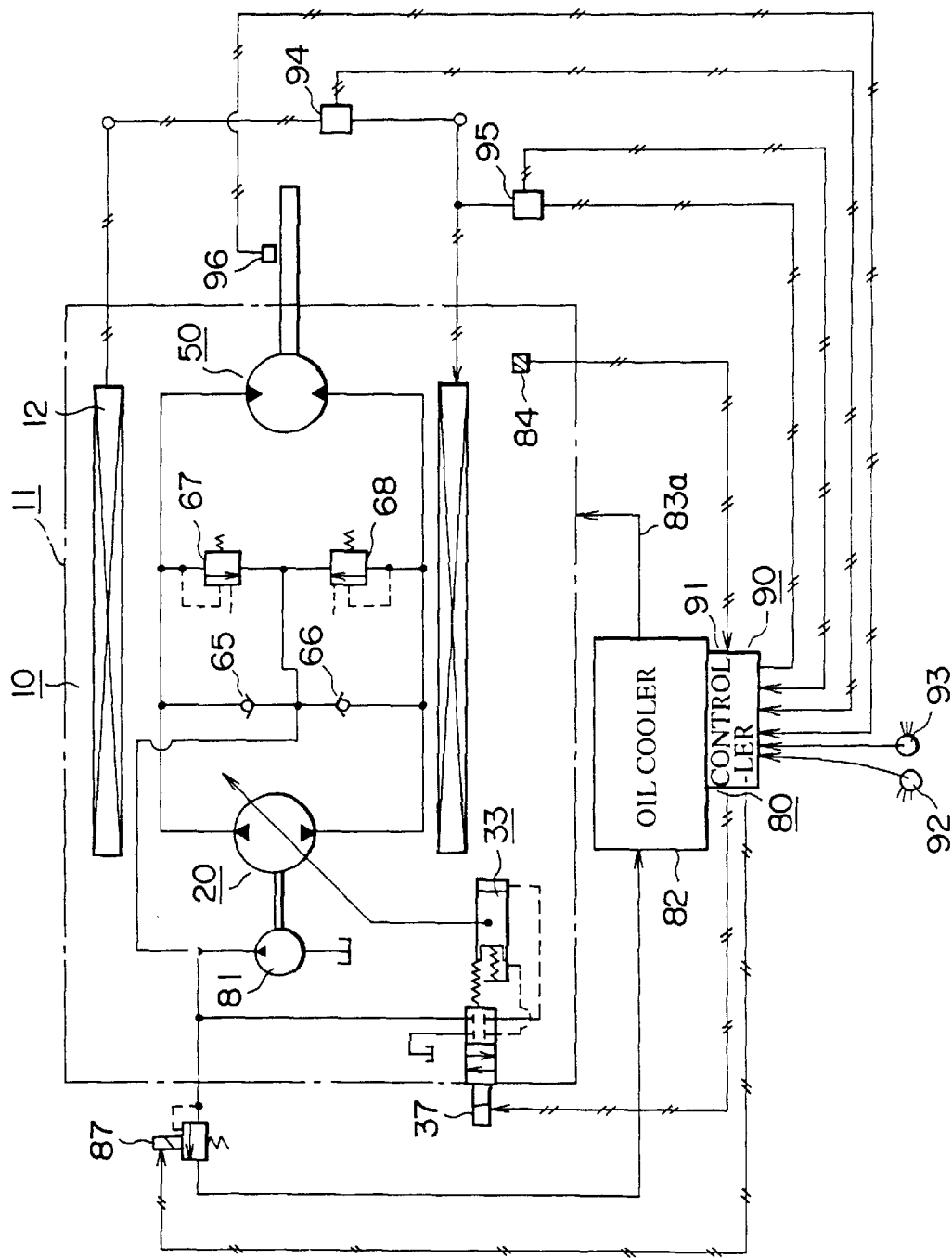
FIG. 1 is a general block diagram of an electric hydraulic hybrid motor relating to an embodiment of the present invention.
Figure 2:
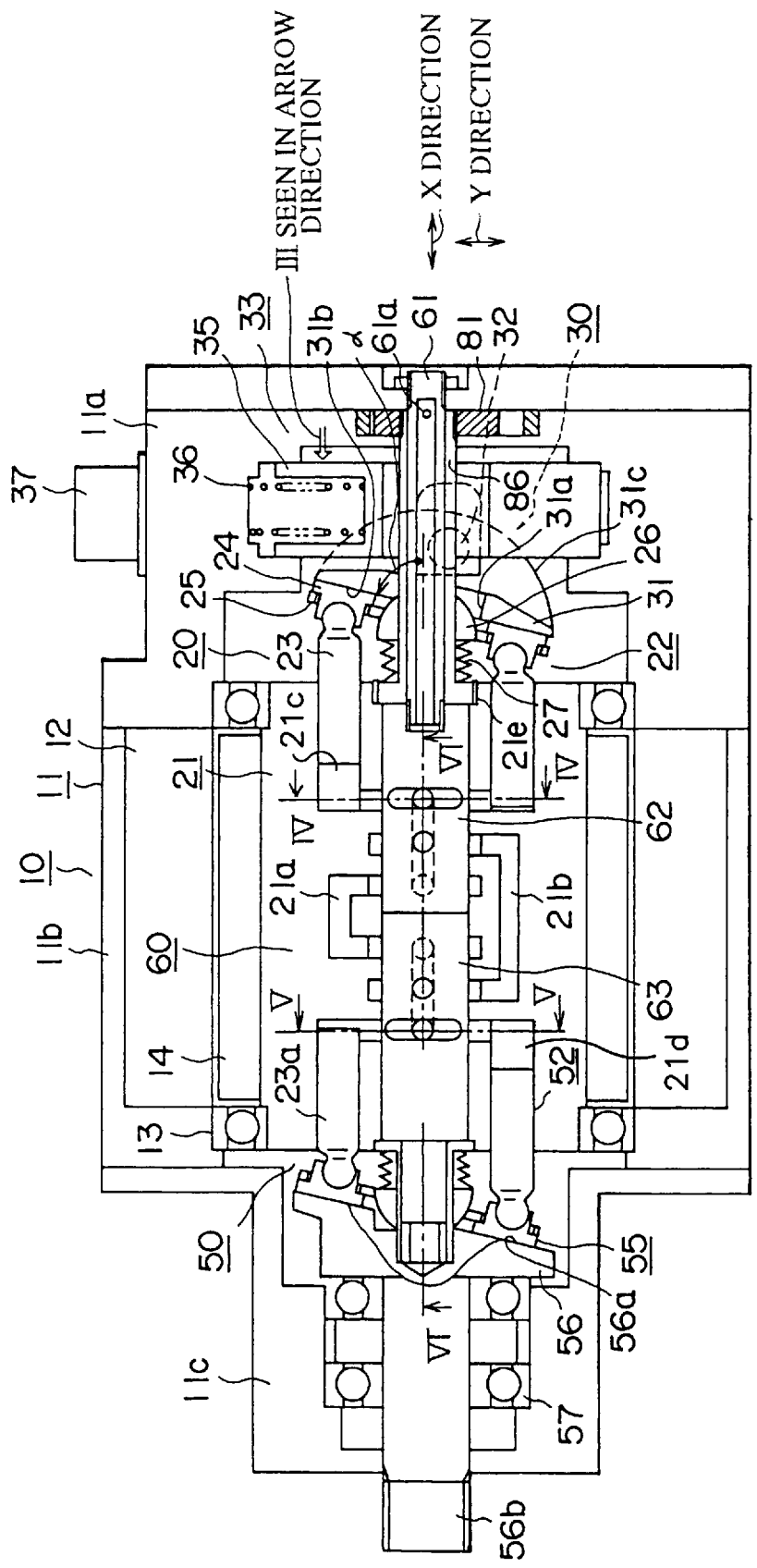
FIG. 2 is an explanatory view of a section of the electric hydraulic hybrid motor relating to the embodiment.
Figure 3:
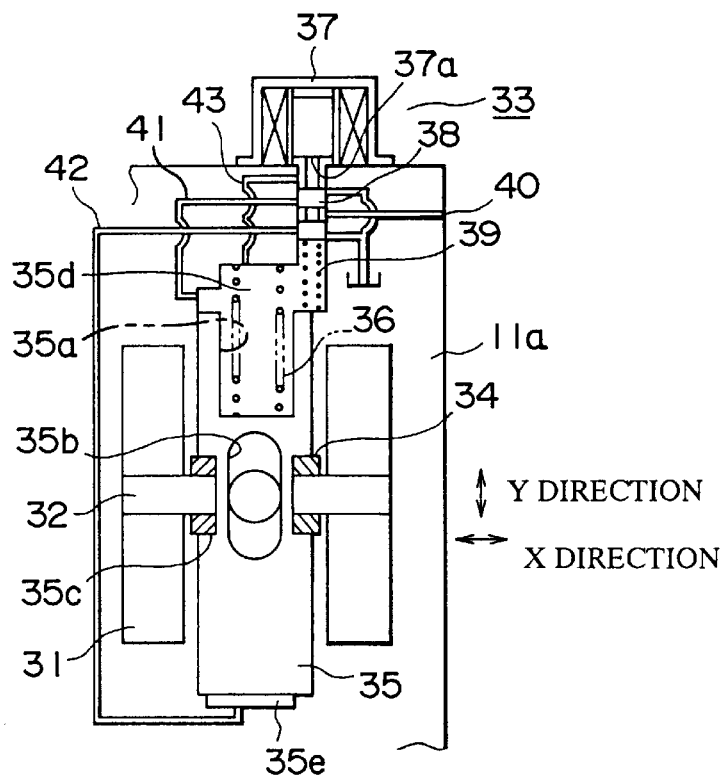
FIG. 3 is a view seen in a direction of the arrow III in FIG. 2.

In FIGS. 1 to 3, an electric hydraulic hybrid motor includes an electric motor 10, a variable displacement hydraulic pump 20 (hereinafter, referred to as a hydraulic pump 20), and a fixed displacement hydraulic motor 50 (hereinafter, referred to as a hydraulic motor 50), which are all partly housed in the case 11 of the stator of the electric motor 10; a switching portion 60, for switching pressurized oil from the hydraulic pump 20 to the hydraulic motor 50; a cooling device 80, attached to the case 11 of the electric motor 10; and a controlling device 90.

The electric motor 10 is defined by the case 11; a stator 12, which is formed by winding a coil and is fixedly provided at the case 11; and a rotor 14, which is placed inwardly of the stator 12 and both ends of which are rotatably supported by the bearings 13, which are attached to the case 11. The case 11 is divided into a pump case 11a, an electrical drive case 11b, and a motor case 11c, in order to make the explanation easy.

The hydraulic pump 20 is defined by a cylinder block 21, a plunger portion 22, a rocker cam portion 30, and a swash plate control portion (variable swash plate control device) 33. The cylinder block 21 is formed integrally with the rotor 14 of the electric motor 10 by press-fitting, welding, or the like, and both ends thereof are rotatably supported by the bearings 13. The plunger portion 22 is defined by a plunger 23; a shoe 24, attached to the plunger 23 by calking or the like so as to freely rock; a retainer 25, for slidably pressing the shoe 24 into a rocker cam portion 30; and a spherical 26 and a spring 27, which collectively press the retainer 25 to make it press the shoe 24. A number of plungers 23, for example, seven or nine plungers 23, can be used, and are evenly distributed in an end of the cylinder block 21 in a circumferential direction. Each plunger 23 is closely inserted into its chamber 21c in the cylinder block 21, and slides in a longitudinal direction of the axis (in the direction of X in FIG. 2) to discharge pressurized oil.

The rocker cam portion 30 is defined by a rocker cam 31 and a pin 32. The rocker cam 31 has a cylindrical hole 31a made at the center thereof, and one surface is formed by a flat surface 31b while the other surface is formed by a cylindrical portion 31c. The shoe 24 slides over the flat surface 31b, while the cylindrical portion 31c is rotationally rocked by being closely inserted into a receiving groove (not illustrated) which has a cylindrical surface and is provided at the pump case 11a. The pin 32 is pressed into and fixed at the rocker cam 31.

A swash plate control portion 33 is defined by a slider 34, a piston 35, a piston spring 36, a solenoid 37, a spool 38, and a spool spring 39. The piston 35 is formed by a cylinder, with a cylindrical opening 35a at one end, into which the piston spring 36 is inserted; and this cylinder has a long hole 35b in its central portion and slit grooves 35c on both sides of the central portion, into which the slider 34 is closely inserted. The pin 32 of the rocker cam 31 is attached to the slider 34 so as to be free to rock. When the piston 35 moves up and down (Y direction), the slider 34, which is closely inserted into the slit groove 35c, slides in a longitudinal direction of the axis (X direction), and the pin 32, which is attached to the slider 34 so as to be free to rock, moves in the Y direction and in the X direction. As a result, the rocker cam 31 rocks along the cylindrical surface and changes a slanted rotation angle α.

The solenoid 37 is attached to the pump case 11a near the piston 35, and the spool 38 is abutted against the foremost end portion 37a of the solenoid 37. The spool 38 is closely inserted into a spool hole in the pump case 11a. One end of the spool spring 39 is abutted against the spool 38 and presses the spool 38 so that the spool 38 is not away from the foremost end portion 37a of the solenoid 37. The other end of the spool spring 39 is abutted against the piston 35. Formed in the pump case 11a are a pressurized oil supplying passageway 40, for supplying pressurized oil from a servo pump to the spool 38, and the connecting passageways 41 and 42, for supplying pressurized control oil to pressure receiving chambers 35d and 35e, which are provided at opposite ends of the piston 35. A connecting passageway 43, connecting to a tank in normal times, is provided at the pressure receiving chamber 35d at one end of the piston 35.

The hydraulic motor 50 is defined by the cylinder block 21 (for common use by the hydraulic pump 20), a plunger portion 52, and a rocker cam portion 55. The plunger portion 52 has the same structure as that of the plunger portion 22 of the hydraulic pump 20. Each plunger 23a shows the plunger of the plunger portion 52 is slidably positioned in its chamber 21d in the cylinder block 21. The rocker cam portion 55 is defined by a rocker cam (swash plate setting device) 56, and a bearing 57. One end surface of the rocker cam 56 is formed by a flat surface 56a and the other end surface of the rocker cam 56 is formed by an output shaft 56b, fixedly placed with respect to the flat surface 56a. The output shaft 56b is supported by the bearings 57, attached to the motor case 11c.

A switching portion 60 is defined by a shaft 61, which is positioned at the axial core of the electric motor 10, the hydraulic pump 20, and the hydraulic motor 50, and which is fixedly attached to the pump case 11a; a pump switching member 62, which is connected to the shaft 61 and which does not rotate; and a motor switching member 63, which is positioned so as to face to the pump switching member 62 and which is fixedly attached to the rocker cam 56 and rotates. The shaft 61, the pump switching member 62, and the pump switching, member 62 are separate elements here, but can be integrally constructed. Further, on the outside of the shaft 61, a driving shaft 86, which drives a charge pump 81 which consists of a trochoidal pump described below, a gear pump, or the like, is connected to the cylinder block 21 through a spline 21e, and placed so as to have the same core as the shaft 61. For the switching portion 60 of the present embodiment, a pintle type is used, but the other types such as a spool type, a valve type, or the like can be used.

The driving shaft 86 is inserted through a cylindrical hole 31a in the rocker cam 31, and guides a spherical segment 26, which presses the retainer 25, while supporting one end of a spring 27. The shaft 61 is provided with a charging circuit to the hydraulic pump 20, described below. The shaft 61 is connected to the pump switching member 62 through a screw or the like to fix the pump switching member 62 in order not to rotate. The charging pump 81 can be driven by an electric motor separately provided.

Figure 4:
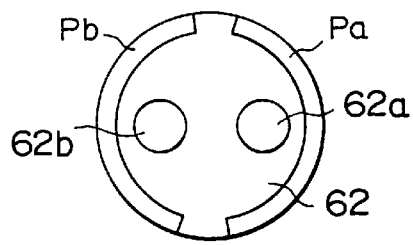
FIG. 4 is an explanatory view taken on the line IV—IV in FIG. 2.
Figure 6:
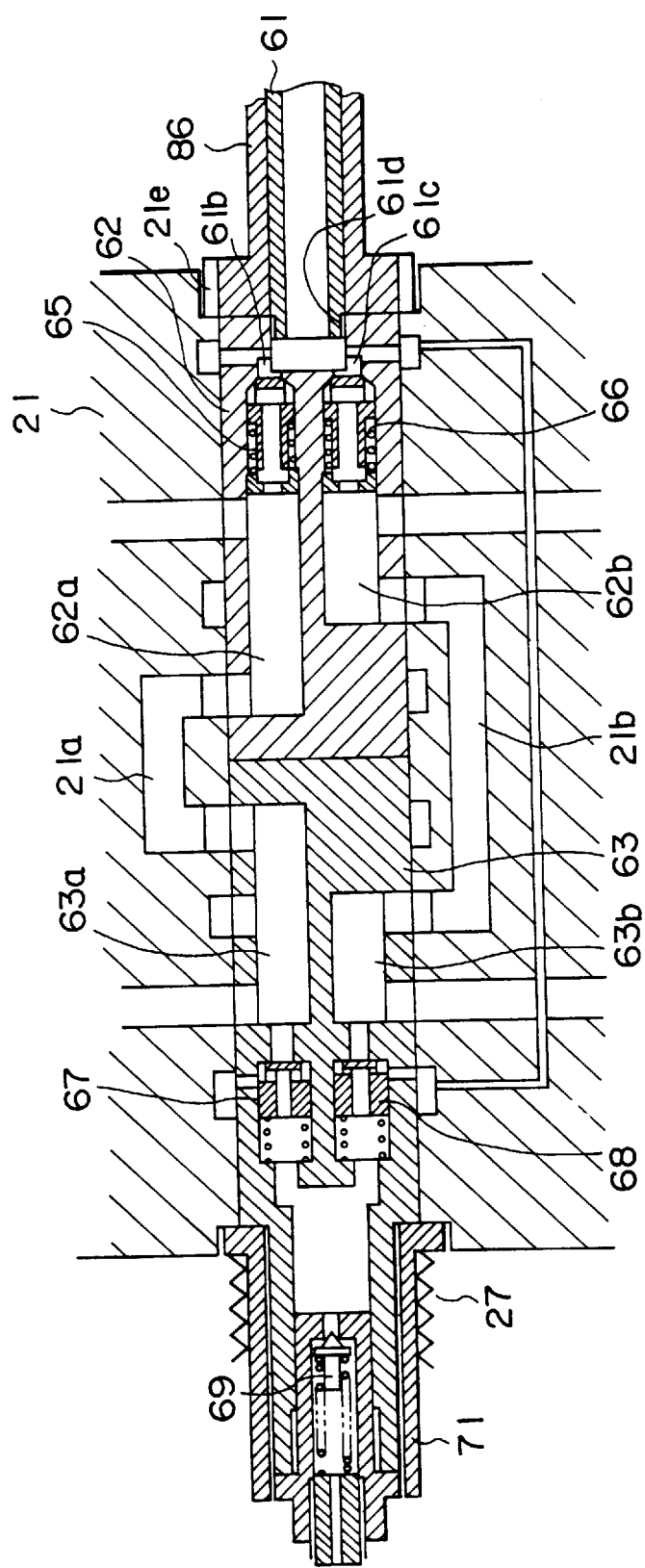
FIG. 6 is a sectional view taken on the line VI—VI in FIG. 2.

In FIG. 6, the pump switching member 62 is supported by the shaft 61 through a spline 61d or the like so as not to be rotated, and is positioned with a specified clearance from the cylinder block 21. Passages 62a and 62b (refer to FIG. 4), formed in the pump switching member 62, selectively communicate with a port for supplying pressurized oil from the hydraulic pump 20 to the hydraulic motor 50. Here the pump switching member 62 is supported by the shaft 61 which has some play, and is mainly supported by the cylinder block 21, making it preferable since the specified clearance is shorter. As a result, there is less leakage from this portion.

Figure 5:
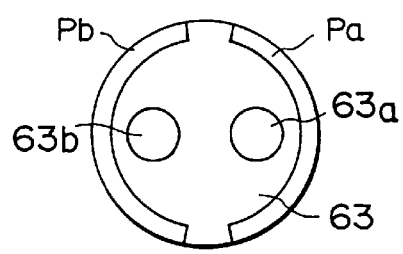
FIG. 5 is an explanatory view taken on the line V—V in FIG. 2.

The motor switching member 63 is arranged with a specified clearance from the cylinder block 21. Passages 63a and 63b (refer to FIG. 5), formed in the motor switching member 63, selectively communicate with a port for supplying pressurized oil from the hydraulic pump 20 to the hydraulic motor 50. Here the motor switching member 63 is supported by the rocker cam 56 with some play, and is mainly supported by the cylinder block 21; therefore, making it preferable since the specified clearance is shorter, and there is less leakage from this portion. The spherical segment 26, which presses the retainer 25, is supported on the driving shaft 86; and a spacer 71, which receives the force of the spring 27, is inserted into the rocker cam portion 55 side of the motor switching member 63.

Provided in the pump switching member 62 is a port Pa (refer to FIG. 4), which communicates with the plunger 23 which discharges the pressurized oil from the hydraulic pump 20. Provided in the motor switching member 63 is a port Pb (refer to FIG. 5), which communicates with the plunger 23a, which takes the pressurized oil into the hydraulic motor 50. Provided in the cylinder block 21 are communicating passageways 21a and 21b, which communicate with the motor switching member 63 and the pump switching member 62.

FIG. 1 depicts the structure of the charging circuit, which is placed inside the shaft 61, to the hydraulic pump 20. In FIG. 2, a hole 61a, connecting to the charging pump 81, is made in one end of the shaft 61. The flow through the hole 61a branches into the two passages 61b and 61c, illustrated in FIG. 6, and the check valves 65 and 66 of the charging circuit are respectively placed in the branched passages 61b and 61c. Safety pilot valves 67 and 68 are placed in passages 63a and 63b of the motor switching member 63. The safety pilot valves 67 and 68 have a pilot valve 69 for common use.

In FIGS. 1 and 2, a cooling device 80 is defined by a charging pump 81, commonly used by the charging circuit; an oil cooler 82; a cooling conduit line 83a from the charging pump 81 to the oil cooler 82, or from the oil cooler 82 to the case 11; a temperature sensor 84, for detecting the temperature of the lubricating oil; a driving shaft 86, which is connected to the cylinder block 21 and drives the charging pump 81; and a variable relief valve 87.

Figure 7:
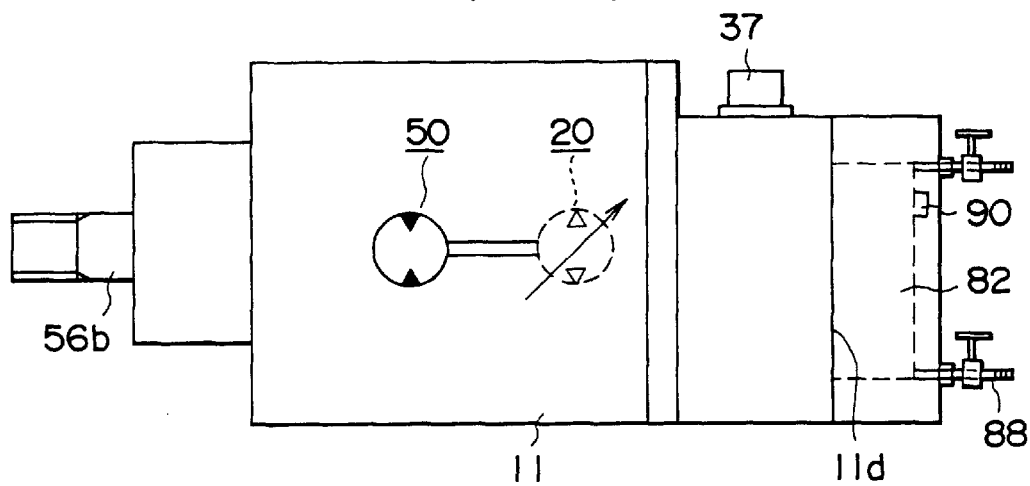
FIG. 7 is an explanatory view when an oil cooler relating to the embodiment is attached to the rear portion of a hydraulic pump.

The charging pump 81 is driven by a spline gear 21e of the cylinder block 21 and distributes oil to the charming circuit and the cooling circuit. The oil in the cooling circuit goes from the charging pump 81 through the variable relief valve 87 to the oil cooler 82, and is cooled in the oil cooler 82. The cooled oil cools and lubricates the stator 12 of the case 11, the bearing 13 of the rotor 14, the bearing 57 of the rocker cam portion 55, the shoe 24 of the plunger portion 22, and the switching portion 60. In FIG. 1, the oil cooler 82 is attached on the side surface of the case 11, but as FIG. 7 depicts, the oil cooler 82 can be placed at the case 11d at the backside of the hydraulic pump 20. The oil cooler 82 can be provided with a valve 88 for cooling the oil by supplying cooling water or cooling gas from the outside.

A controlling device 90 includes a controller 91; an electric power consumption setting switch (electric power consumption setting device) 92 for the electric motor 10; an output torque setting switch (output torque setting device) 93 for the hydraulic motor 50; a voltage detecting sensor (voltage detecting device) 94, which detects the voltage to the stator 12 of the electric motor 10; an electric current detecting sensor (electric current detecting device) 95, which detects the electric current to the stator 12; a rotational speed detecting sensor (rotational speed detecting device) 96, which detects the rotational speed of the hydraulic motor 50; and the temperature sensor 84, which detects the temperature of the oil in the cooling device 80.

The controller 91 measures the temperature of the oil for lubrication and cooling in the case 11 of the electric motor 10, and when the temperature is equal to or greater than a specified value, the controller 91 outputs a command to the cooling device 80 to actuate the same. The controller 91 computes the actual electric power consumption of the electric motor 10, based on the voltage and the current to the stator 12; compares the electric power consumption set value, from the electric power consumption setting switch 92, and the actual electric power consumption of the electric motor 10; and outputs to the swash plate control portion 33 of the hydraulic pump 20 a signal for controlling the discharge rate of the hydraulic pump 20. Or the controller 91 computes the actual output torque outputted by the hydraulic motor 50, based on the voltage and the current to the stator 12 and the rotational speed of the hydraulic motor 50; compares the set output torque value, from the output torque setting device 93, and the computed output torque; and outputs to the swash plate control portion 33 a signal for controlling the discharge rate of the hydraulic pump 20.

Now, the operation of the electric hydraulic hybrid motor will be explained.

The controlling device 90 receives an external command, and passes a specified current to the stator 12 in order to operate the rotor 14 of the electric motor 10 in a specified rotational direction and at a specified output rotational speed. The stator 12 receives current, generates magnetism, and rotates the rotor 14 in a direction selected from left and right directions. As a result of the above, the cylinder block 21, formed integrally with the rotor 14, is rotated in a specified direction. At this time, when the controlling device 90 directs the output rotation to be zero, specifically, when the solenoid 37 does not press the spool 38 since the solenoid 37 does not receive the command from the controlling device 90, the piston 35 stops at the position illustrated in FIG. 3 without receiving the controlling pressure.

Accordingly, the rocker cam portion 30 of the hydraulic pump 20 is at a specified angle $\alpha_0$ as originally set. At this time, the rocker cam 56 of the hydraulic motor 50 is similarly at the fixed angle $\alpha_0$ originally set, and the hydraulic pump 20 and the hydraulic motor 50 have the same discharge rate (cc/rev). As a result, the amount discharged from the hydraulic pump 20 is the same as the amount taken in by the hydraulic motor 50, and the plunger 23 of the hydraulic pump 20 has the same amount of stroke as the plunger 23a of the hydraulic motor 50. Accordingly, since the discharge rate from the hydraulic pump 26 is the same as that of the hydraulic motor 50, the plunger 23a of the hydraulic motor 50 does not work on the rocker cam portion 55, and idles freely over the rocker cam 56. As a result, the output shaft 56b of the hydraulic motor 50 is not rotated.

The rotational speed of the output shaft 56b of the hydraulic motor 50 is shown by the following equation, $$Nm=[(Qm-Qp)\times Np]/Qm.$$

Here, Nm=the rotational speed of the output shaft 56b of the hydraulic motor 50, Np=the rotational speed of the hydraulic pump 20 (rotational speed of the rotor 14), QM=the discharge rate of the hydraulic motor 50 (cc/rev), and Qp=the discharge rate from the hydraulic pump 20 (cc/rev).

Next, when the controlling device 90 directs a specified output rotational speed, specifically, when the solenoid 37 receives a command from the controlling device 90 and presses the spool 38, the controlling, pressure passing the spool 38 acts on the pressure receiving chamber 35e of the piston 35 of the swash plate controlling portion 33, and presses the piston 35 upwardly (upwardly in the Y direction in FIG. 3). As a result, the rocker cam 31 is rotated in a counterclockwise direction from a specified angle $\alpha_0$ to make the slanted rotation angle a smaller. At this time, the piston 35 presses the spool spring 39 upwardly to return the spool 38 to the original position, and stops the supply of controlling pressure to the pressure receiving chamber 35e to stop the movement. As a result, the discharge rate from the hydraulic pump 20 is decreased, and the swash plate is stopped at a position of a specified discharge rate. For example, when the discharge rate is made to be zero (Qp=0), by making the rocker cam 31 of the hydraulic pump 20 vertical to the axial core, a rotational speed NM is equal to the rotational speed of a rotational speed Np of the hydraulic pump 20. Specifically, the rotational speed NM is equal to the rotational speed of the rotor 14.

If the discharge rate Qp is made to be —Qm by making the rocker cam 31 to be at a specified angle $-\alpha_0$ in an opposite direction illustrated in the drawing, specifically, opposite to the vertical direction of the axial core, the rotational speed NM becomes twice as high as the rotational speed of the rotor 14.

When the intake rate is not enough for the discharge rate from the hydraulic pump 20, as the result of pressurized oil leaking from the hydraulic pump 20, the hydraulic motor 50, the pump switching member 62, or from the motor switching member 63 in the above, pressurized oil is supplied through the check valves 65 and 66 in the charging circuit in the shaft 61. As a result, the pressurized oil is replenished from the vicinity, so that a vacuum is not produced with less resistance, and the pressure in the charging circuit can be set low. By controlling the pilot valve 69, attached at the circuit from the hydraulic pump 20 to the hydraulic motor 50 from the outside, and by making the pressure of the circuit to be zero, the output torque of the hydraulic motor 50 can be zero.

In the cooling circuit, the temperature sensor 84 detects that the temperature of the lubricating oil in the case 11 rises to a specified temperature or higher, controls the pressure of the check-valve 87, and passes the lubricating oil to the oil cooler 82. The lubricating oil which is cooled in the oil cooler 82 enters the case 11 through the conduit line 83a, and cools and lubricates the stator 12, the bearing 13 of the rotor 14, the bearing 57 of the rocker cam portion 55, the shoe 24 of the plunger portion 22, and the switching portion 60. The cooling circuit can be operated from the time of starting instead of its operation being controlled by the controlling device 90.

Figure 8:
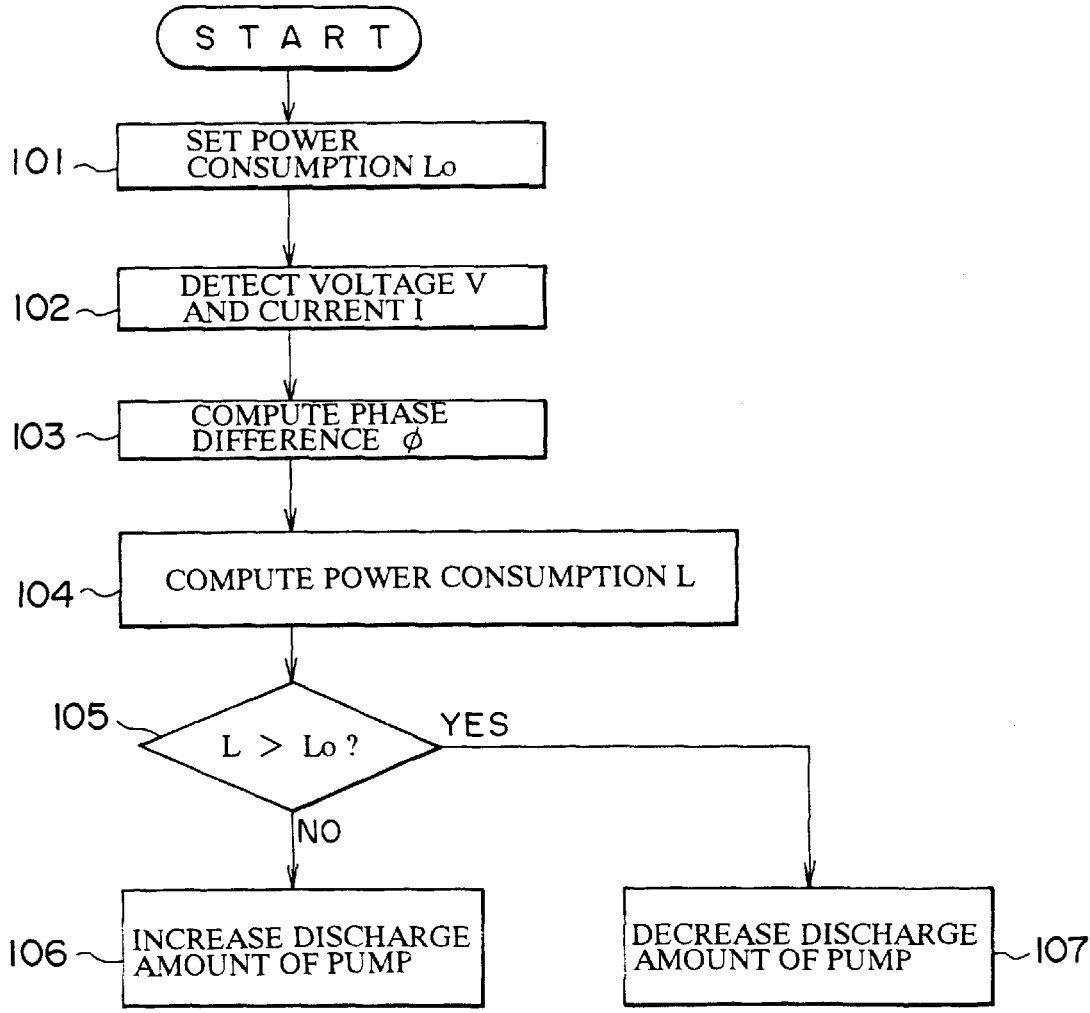
FIG. 8 is a flow chart of the equal horsepower control relating to the embodiment.

Next, an equal horsepower control will be explained with reference to the flow chart in FIG. 8.

In step 101, the set electric power consumption Lo of the electric hydraulic hybrid motor is inputted and memorized in a storage device (not illustrated) of the controller 91 by the electric power consumption setting switch 92 in accordance with the electric power of each facility in a factory or the like, or the electric power consumption of a device to be driven. In step 102, the voltage V and the current I to the stator 12 of the electric motor 10 are detected by the voltage detecting sensor 94 and the electric current detecting sensor 95, and each detected value is sent to the controller 91. In step 103, the controller 91 obtains phase difference $\phi$ from the transition in the change of the voltage or the current. In step 104, the controller 91 obtains the actual electric power consumption L consumed, when the electric motor 10 actually drives the hydraulic pump 20, from the formula $[L=V \times I \times \cos \phi]$.

In step 105, it is determined whether the actual electric power consumption L is greater than the electric power consumption set value Lo. When the actual electric power consumption L is Lo or less (L≦Lo), the control process proceeds to step 106. In step 106, the controller 91 outputs a control signal to the solenoid 37 to increase the discharge rate from the hydraulic pump 20. The solenoid 37, which is displaced by receiving the signal, presses the spool 38 and sends the pressurized pilot oil from the charging pump 81 to the pressure receiving chamber 35d of the piston 35 to move the piston 35. The piston 35 changes the angle $\alpha$ of the rocker cam 31 through the slider 34, and increases the discharge rate Qp from the hydraulic pump 20.

On the other hand, when the actual electric power consumption L is greater than Lo (L>Lo), the control process proceeds to step 107, and the controller 91 outputs a control signal to the solenoid 37 to decrease the amount of discharge from the hydraulic pump 20. The solenoid 37, which is displaced by receiving the signal, presses the spool 38 and sends the pressurized pilot oil from the charging pump 81 to the pressure receiving chamber 35e of the piston 35 to move the piston 35. By that movement, the angle $\alpha$ of the rocker cam 31 is changed, and the discharge rate Qp is decreased. As a result, the electric power consumption of the electric motor 10 is increased, and a constant electric power consumption can be obtained.

As in the above, by controlling the electric motor 10 so as to consume a constant electric power, the equal horsepower control of an electric hydraulic hybrid motor can be carried out, thereby enabling the equal horsepower control up to the upper limit of the output of the electric motor 10. For example, at a time of a suspending operation in a crane or the like, when suspending a heavy load, the speed is controlled at a low setting, and when suspending a light load, the speed is controlled at a high setting.

Next, an equal torque control will be explained by using the flow chart in FIG. 9.

In step 201, the storage device of the controller 91 has a required torque To of the hydraulic motor 50 inputted, by the output torque setting switch 93 in accordance with a required torque of the device to be driven, and memorizes the same. In step 202, the voltage V and the current I to the stator 12 are detected by the voltage detecting sensor 94 and the current detecting sensor 95, and each detected value is sent to the controller 91. In step 203, the controller 91 obtains the phase difference $\phi$ from the transition in the chances of the voltage or the current. In step 204, the rotational speed $\omega$ of the output shaft 56b of the hydraulic motor 50 is detected by the rotational speed detecting sensor 96, and is sent to the controller 91. In step 205, the controller 91 obtains the actual generating torque T of the electric motor 10 from the formula $[T=(V \times I \times \cos \phi)/\omega]$.

In step 206, it is determined whether the actual generating torque T is greater than the required torque To from the output torque setting switch 93. When the actual generating torque T is greater than the required torque To (T>To), the control process proceeds to step 207. In step 207, the controller 91 outputs a control signal to the solenoid 37 to increase the amount of the discharge from the hydraulic pump 20. The solenoid 37 is displaced after receiving the signal, pressing the spool 38 and sending the pressurized pilot oil from the charging pump 81 to the pressure receiving chamber 35d, and moving the piston 35. The piston 35 changes the angle $\alpha$ of the rocker cam 31 through the slider 34, and increases the discharge rate Qp of the hydraulic pump 20, thereby increasing the rotational speed of the hydraulic motor 50 and decreasing the actual generating torque T.

On the other hand, when the actual generating torque T is the required torque To or less in step 207 (T≦To), the control process proceeds to step 208. In step 208, the controller 91 outputs a control signal to the solenoid 37 to decrease the amount of discharge from the hydraulic pump 20. The solenoid 37 is displaced after receiving the signal, pressing the spool 38 and sending the pressurized pilot oil from the charging pump 81 to the pressure receiving chamber 35e, and moving the piston 35. This movement displaces the angle $\alpha$ of the rocker cam 31 and decreases the discharge rate Qp, thereby decreasing the rotational speed of the hydraulic motor 50 and increasing the actual generating torque T.

By controlling as in the above, the equal torque control can be obtained. Accordingly, when the limit torque of the driving system of the machine to be used has already been set, the machine can be used with the output torque being constantly regulated. As in the above, an accurate output of the rotational speed can be controlled by carrying out a feedback control by detecting the rotational speed co of the output shaft 56b at the rotational speed sensor 96.

As explained in the above, according to the present invention, the entire length is shortened as a result of placing the hydraulic pump and hydraulic motor in a position to the interior of the stator and the rotor of the electric motor. In addition, the hydraulic pump and the hydraulic motor are placed so as to be opposed to each other; therefore, the structure can be simplified. By giving the power from the electric motor to the hydraulic pump, and by driving the hydraulic motor by the hydraulic pump, a specified rated torque can be obtained from low speed to high speed. Further, by using the hydraulic pump and the hydraulic motor, the output rotational speed can be easily changed from low speed to high speed. As for the electric motor, hydraulic pump and hydraulic motor, generated heat is removed and lubrication is provided by the oil cooler which is attached to the case; therefore, the structure is simplified. In addition, as the temperature of the lubricating oil is detected by the temperature sensor and is automatically controlled to be a specified temperature, the management, maintenance, and operation can be simplified. The equal horsepower control is carried out by measuring the electric power consumption of the electric motor and controlling the set value of the measured value; therefore, in the case of a crane, the speed can be changed in accordance with conditions in which the crane is used, and the operation efficiency can be improved. The equal torque control is carried out by measuring the output rotational speed and by controlling the discharge rate of the hydraulic pump; therefore, when the output torque is limited, an excellent effect of enabling torque limiter control can be obtained.

INDUSTRIAL AVAILABILITY

The present invention is useful as an electric hydraulic hybrid motor, a control device, and a control method for the same motor, which is small in size and simple in structure, which can improve operational efficiency with the speed being variable when equal horsepower controlled, and which can be torque limiter controlled when the torque limit is required.

We claim:

1. An electric hydraulic hybrid motor comprising:
   an electric motor having a stator and a rotor;
   a hydraulic pump;
   a hydraulic motor;
   a cylinder block, which is positioned inwardly of said rotor and which is rotatable integrally with said rotor, said cylinder block having at least one first chamber and at least one second chamber formed therein;
   said hydraulic pump having at least one pump plunger, each pump plunger being slidably positioned in a respective one of said at least one first chamber in said cylinder block so that each pump plunger is rotatable integrally with said rotor;
   said hydraulic motor having at least one motor plunger, each motor plunger being slidably positioned in a respective one of said at least one second chamber;
   a variable swash plate control device for setting a discharge rate for said hydraulic pump;
   a swash plate setting device for setting a discharge rate for said hydraulic motor; and
   a case, wherein said cylinder block, said at least one pump plunger, said at least one motor plunger, said variable swash plate control device, and said swash plate setting device are positioned.

2. An electric hydraulic hybrid motor in accordance with claim 1, wherein said cylinder block has a first axial end and a second axial end, wherein each said at least one first chamber is formed in the first axial end of said cylinder block, and wherein each said at least one second chamber is formed in the second axial end of said cylinder block.

3. An electric hydraulic hybrid motor in accordance with claim 2, further comprising a pump rocker cam for causing axial movement of said at least one pump plunger, and wherein said variable swash plate control device controls said pump rocker cam to set a discharge rate for said hydraulic pump.

4. An electric hydraulic hybrid motor in accordance with claim 3, wherein said swash plate setting device for setting a discharge rate for said hydraulic motor comprises an output shaft, and a motor rocker cam for causing rotation of said output shaft responsive to axial movement of said at least one motor plunger.

5. An electric hydraulic hybrid motor in accordance with claim 4, wherein said cylinder block contains a switching portion for switching pressurized oil from the hydraulic pump to the hydraulic motor.

6. An electric hydraulic hybrid motor in accordance with claim 5, wherein said at least one first chamber comprises a plurality of first chambers circumferentially distributed evenly in the first axial end of said cylinder block, wherein said at least one pump plunger comprises a plurality of pump plungers with each of said pump plungers being slidably positioned in a respective one of said plurality of first chambers, wherein said at least one second chamber comprises a plurality of second chambers circumferentially distributed evenly in the second axial end of said cylinder block, and wherein said at least one motor plunger comprises a plurality of motor plungers with each of said motor plungers being slidably positioned in a respective one of said plurality of second chambers.

7. An electric hydraulic hybrid motor in accordance with claim 2, wherein said at least one first chamber comprises a plurality of first chambers circumferentially distributed evenly in the first axial end of said cylinder block, wherein said at least one pump plunger comprises a plurality of pump plungers with each of said pump plungers being slidably positioned in a respective one of said plurality of first chambers, wherein said at least one second chamber comprises a plurality of second chambers circumferentially distributed evenly in the second axial end of said cylinder block, and wherein said at least one motor plunger comprises a plurality of motor plungers with each of said motor plungers being slidably positioned in a respective one of said plurality of second chambers.

8. An electric hydraulic hybrid motor in accordance with claim 2, wherein said swash plate setting device for setting a discharge rate for said hydraulic motor comprises an output shaft, and a motor rocker cam for causing rotation of said output shaft responsive to axial movement of said at least one motor plunger.

9. An electric hydraulic hybrid motor in accordance with claim 1, further comprising a cooling device for removing heat from said case.

10. An electric hydraulic hybrid motor in accordance with claim 1, further comprising:
    a support shaft extending into said cylinder block and containing a passageway;
    a source of pressurized oil; and
    a charging hydraulic circuit for passing pressurized oil from said source through said passageway in said support shaft for said at least one first chamber.

11. An electric hydraulic hybrid motor in accordance with claim 10, wherein:
    said cylinder block has a first axial end and a second axial end;
    said at least one first chamber comprises a plurality of first chambers circumferentially distributed evenly in the first axial end of said cylinder block, said at least one pump plunger comprises a plurality of pump plungers with each of said pump plungers being slidably positioned in a respective one of said plurality of first chambers, said at least one second chamber comprises a plurality of second chambers circumferentially distributed evenly in the second axial end of said cylinder block, and said at least one motor plunger comprises a plurality of motor plungers with each of said motor plungers being slidably positioned in a respective one of said plurality of second chambers.

12. An electric hydraulic hybrid motor in accordance with claim 11, wherein said swash plate setting device for setting a discharge rate for said hydraulic motor comprises an output shaft, and a motor rocker cam for causing rotation of said output shaft responsive to axial movement of said at least one motor plunger;

wherein said cylinder block includes an axial opening extending therethrough; and wherein said electric hydraulic hybrid motor further comprises:

a pump switching member positioned in said axial opening and connected to said support shaft; said pump switching member containing passages for selectively passing pressurized oil, received from said passageway in said support shaft, to various ones of the plurality of first chambers; and a motor switching member positioned in said axial opening so as to face said pump switching member; said motor switching member engaging said motor rocker cam and rotating with said cylinder block; said motor switching member containing passages for selectively passing pressurized oil, received from said passages in said pump switching member, to various ones of the plurality of second chambers.

13. An electric hydraulic hybrid motor in accordance with claim 12, wherein said support shaft and said pump switching member are stationary, and wherein each of the passages in said pump switching member contains a check valve.

14. Apparatus comprising:

an electric hydraulic hybrid motor in accordance with claim 1;

an electric power consumption setting device for setting a set electric power consumption for said electric motor;

a voltage detecting device for detecting a voltage to said stator;

an electric current detecting device for detecting an electric current to said stator; and a controller, which computes an actual electric power consumption of said electric motor based on the thus detected voltage and the thus detected electric current, which compares said set electric power consumption and the thus computed electric power consumption, and which outputs a signal to control the discharge rate from said hydraulic pump in a manner corresponding to a result of that comparison.

15. Apparatus comprising:

an electric hydraulic hybrid motor in accordance with claim 1;

an output torque setting device for setting a set output torque for said hydraulic motor;

a rotational speed detecting device for detecting a rotational speed of said hydraulic motor;

a voltage detecting device for detecting a voltage to said stator;

an electric current detecting device for detecting an electric current to said stator; and a controller, which computes an actual output torque of said hydraulic motor based on the thus detected rotational speed, the thus detected voltage, and the thus detected electric current, which compares said set output torque and the thus computed output torque, and which outputs a signal to said variable swash plate controlling device to control the discharge rate from said hydraulic pump in a manner corresponding with a result of that comparison.

16. A method for controlling an electric hydraulic hybrid motor in accordance with claim 1, said method comprising the steps of:

setting a set electric power consumption for said electric motor;

computing an actual electric power consumption of said electric motor while supplying variable amounts of discharge to said hydraulic motor; and decreasing the discharge rate from said hydraulic pump when the thus computed electric power consumption is greater than said set electric power consumption.

17. A method for controlling an electric hydraulic hybrid motor in accordance with claim 1, said method comprising the steps of:

setting a set output torque for said hydraulic motor;

computing an actual output torque from said hydraulic motor based on electric current and voltage to said electric motor and a rotational speed of said hydraulic motor; and when the thus computed output torque is greater than said set output torque, increasing the discharge rate from said hydraulic pump.

18. Apparatus comprising:

an electric hydraulic hybrid motor in accordance with claim 6;

an electric power consumption setting device for setting a set electric power consumption for said electric motor;

a voltage detecting device for detecting a voltage to said stator;

an electric current detecting device for detecting an electric current to said stator; and a controller, which computes an actual electric power consumption of said electric motor based on the thus detected voltage and the thus detected electric current, which compares said set electric power consumption and the thus computed electric power consumption, and which outputs a signal to control the discharge rate from said hydraulic pump in a manner corresponding to a result of that comparison.

19. Apparatus comprising:

an electric hydraulic hybrid motor in accordance with claim 6;

an output torque setting device for setting a set output torque for said hydraulic motor;

a rotational speed detecting device for detecting a rotational speed of said hydraulic motor;

a voltage detecting device for detecting a voltage to said stator;

an electric current detecting device for detecting an electric current to said stator; and a controller, which computes an actual output torque of said hydraulic motor based on the thus detected rotational speed, the thus detected voltage, and the thus detected electric current, which compares said set output torque and the thus computed output torque, and which outputs a signal to said variable swash plate controlling device to control the discharge rate from said hydraulic pump in a manner corresponding with a result of that comparison.

20. A method for controlling an electric hydraulic hybrid motor in accordance with claim 6, said method comprising the steps of:

setting a set electric power consumption for said electric motor;

computing an actual electric power consumption of said electric motor while supplying variable amounts of discharge to said hydraulic motor; and decreasing the discharge rate from said hydraulic pump when the thus computed electric power consumption is greater than said set electric power consumption.

21. A method for controlling an electric hydraulic hybrid motor in accordance with claim 6, said method comprising the steps of:

setting a set output torque for said hydraulic motor;

computing an actual output torque from said hydraulic motor based on electric current and voltage to said electric motor and a rotational speed of said hydraulic motor; and when the thus computed output torque is greater than said set output torque, increasing the discharge rate from said hydraulic pump.

* * * * *